United States Patent [19]

Ezoe

[11] 4,441,359

[45] Apr. 10, 1984

[54] METHOD AND APPARATUS FOR INSPECTING VEHICLES

[75] Inventor: Mitsuhiko Ezoe, Yokosuka, Japan

[73] Assignee: Nissan Motor Company, Limited, Kanagawa, Japan

[21] Appl. No.: 354,449

[22] Filed: Mar. 3, 1982

[30] Foreign Application Priority Data

Mar. 4, 1981 [JP] Japan .................................. 56-29796

[51] Int. Cl.³ ............................................ G01M 15/00
[52] U.S. Cl. ....................................... 73/117; 364/551
[58] Field of Search ................ 73/117, 117.3; 364/551

[56] References Cited

U.S. PATENT DOCUMENTS 3,439,534 4/1969 Pilgrim .................................... 73/117
3,630,076 12/1971 Staudt ................................... 73/117.3
3,889,273 6/1975 Deiss et al. ......................... 73/117 X
4,121,452 10/1978 Wakabayashi et al. ................ 73/117

FOREIGN PATENT DOCUMENTS 51-131034 11/1976 Japan .

Primary Examiner—Jerry W. Myracle
Attorney, Agent, or Firm—Lowe, King, Price & Becker

[57] ABSTRACT

Different types of automotive vehicles having differing age and mileage parameters are automatically inspected. The different types of vehicles are variables such as vehicle maker, model, and engine type. A programmed digital computer responds to outputs of measuring instruments for inspected engine, steering and braking responses of the vehicles. For each vehicle, the computer is supplied with data indicative of the vehicle type, the parameters and with signals indicative of the vehicle engine, steering, and braking responses. The computer responds to the program, signals and data to (a) derive extreme values for a range of acceptable values for each of the inspected engine, steering and braking responses, (b) compare the outputs of the measuring instruments indicative of the vehicle engine, steering, and braking responses, and (c) derive a malfunction signal for each engine, steering and braking response outside of the range of values therefor.

18 Claims, 11 Drawing Figures

METHOD AND APPARATUS FOR INSPECTING VEHICLES

BACKGROUND OF THE INVENTION

This invention relates to a method and apparatus for inspecting vehicles, parts, or accessories thereof.

In order to secure safety of motor cars and to prevent environmental harm resulting from exhaust gas thereof, inspections and adjustments at certain periods and mileages are legally required of automotive vehicles. U.S. Pat. No. 4,121,452 discloses a computer-equipped inspection and examination apparatus for motor cars. In this apparatus, the measured results of inspection items, such as wheel alignment, engine characteristics, and exhaust gas, are compared to respective reference values therefor to determine whether the results are acceptable or not.

The required reference values usually depend on age and/or mileage of the motor car, so that the reference values should be set dependent on the age and/or mileage of the motor car to achieve the reliable judgement as to the measured result of each inspection item.

SUMMARY OF THE INVENTION

It is an object of the present invention to provide a method and apparatus for inspecting vehicles, such as motor cars, which produces adequate reliability.

Another object of the present invention is to provide a method and apparatus for inspecting vehicles wherein reference values for descriminating whether the measured results of inspection items are acceptable or not depend on the age and/or mileage of the motor car.

In a method and apparatus for inspecting vehicles according to the present invention, signals are generated which indicate the type of vehicle being inspected, a plurality of vehicle parameters are measured to generate vehicle measurement signals indicative of the vehicle parameters, and additional vehicle signals are generated which indicate at least one of vehicle age and mileage. A plurality of reference value signals are generated in response to the vehicle type signals and the additional vehicle signals. The vehicle measurement signals are compared with the reference value signals to generate indications of whether the vehicle condition is acceptable or unacceptable signals.

The above and other objects, features and advantages of the present invention will be apparent from the following description of preferred embodiments thereof, taken in conjunction with the drawings.

DESCRIPTION OF THE PREFERRED EMBODIMENTS

Figure 1:
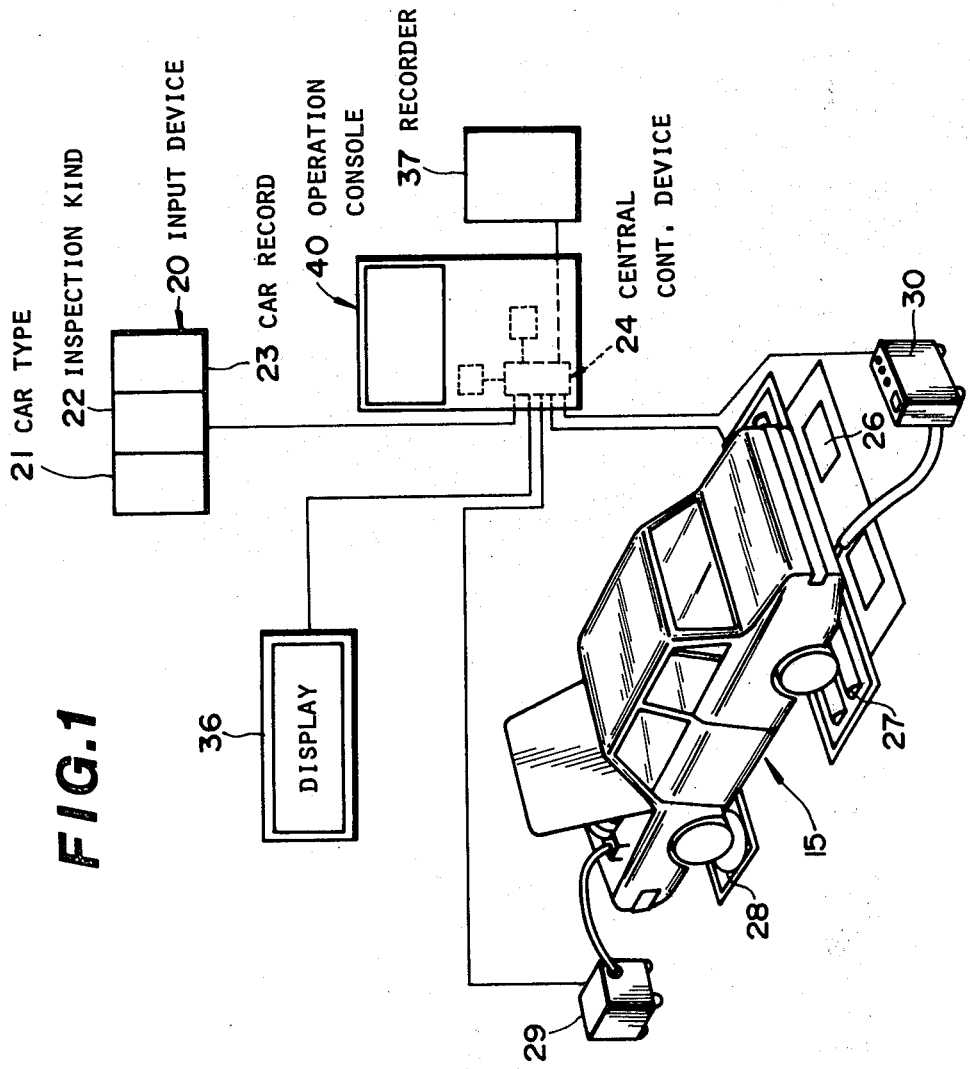
FIG. 1 is a schematic perspective view of an apparatus for inspecting a motor car according to a first embodiment of the present invention.
Figure 2:
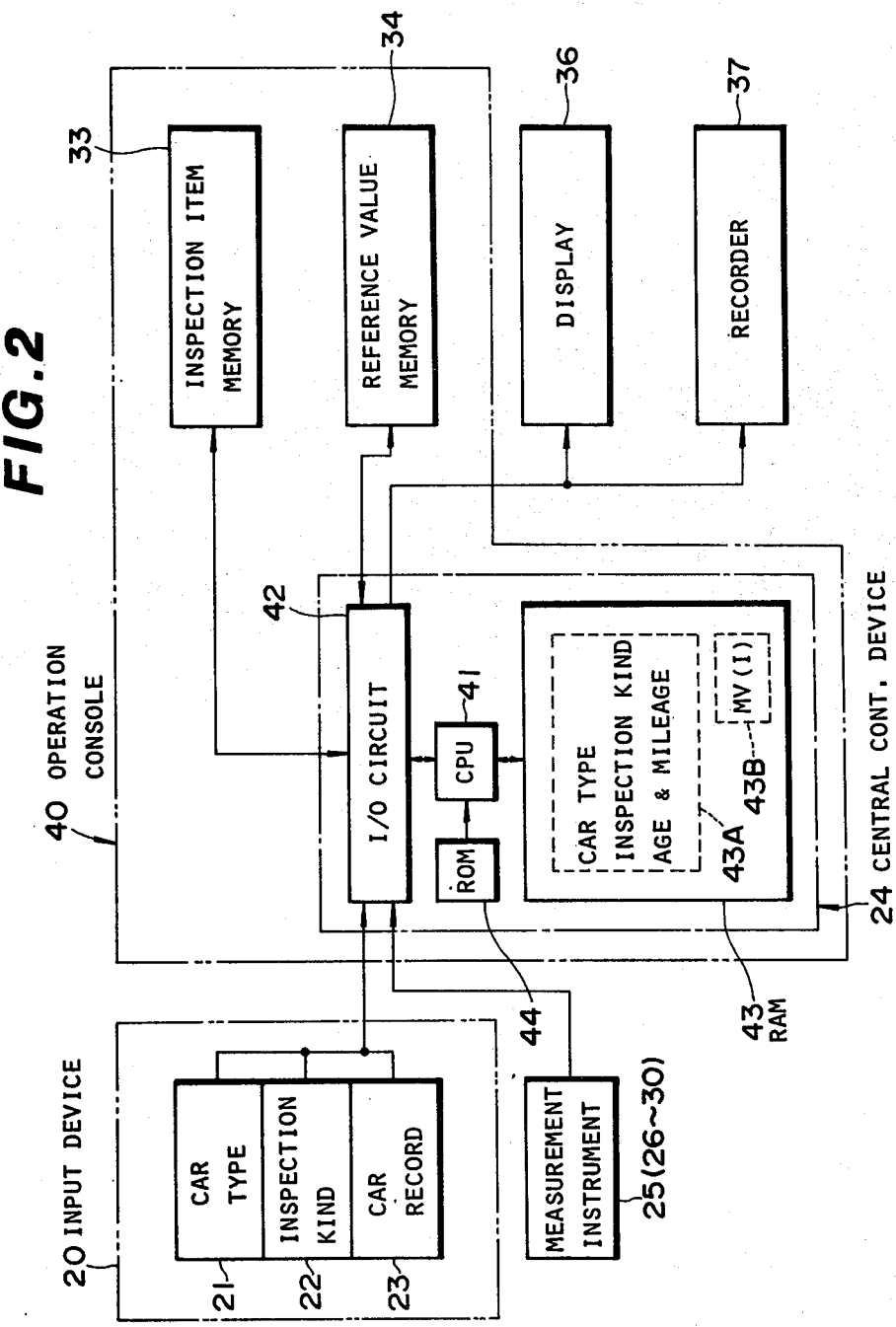
FIG. 2 is a schematic diagram of the apparatus in FIG. 1.

With reference to FIGS. 1 and 2, there is shown an apparatus for inspecting a motor car 15 according to a first embodiment of the present invention. This apparatus has an input device 20 which includes car type, inspection kind, and car record input circuits 21, 22, and 23 respectively. These input circuits 21, 22, and 23 are provided with a common keyboard (not shown) and are connected to a central control device 24. Before starting inspection of the motor car 15, the keyboard of the input device 20 is operated to supply the central control device 24 with signals indicative of the car type, inspection kind, and car record, respectively.

The car type input circuit 21 indicates the name of a maker, the variety, i.e. model, of the car, the type of the engine, and the type of the transmission. The name of a maker is represented by a combination of letters, such as NSN (NISSAN) or TYT (TOYOTA). The variety of the car is represented by a combination of letters and numerals, such as 910 or P52. The type of the engine is also represented by a similar combination, such as L20 or Z18. The type of the transmission is also represented by a similar combination, such as MT (manual transmission) or AT (automatic transmission). The car type is designated by a sequence of these combinations, for example, NSN-910-L20-MT. The car type input circuit 21 supplies the central control device 24 with a signal indicative of the car type fed by way of the keyboard.

The inspection kind input circuit 22 indicates the type of legally required inspection, such as a 6-month check, 12-month check, or 24-month check, and the designation of check points, such as a engine only. The inspection kind is represented as a sequence of letters and numerals in a similar way to the case of the car type. The inspection kind input circuit 22 supplies the central control device 24 with a signal indicative of the inspection kind fed by way of the keyboard.

The car record input circuit 23 indicates the date of manufacture or age of the car, and the mileage of the car. The car record is represented as a sequence of numerals (and letters) in a similar way to the case of the car type. The car record input circuit 23 supplies the central control device 24 with a signal indicative of the car record fed by way of the keyboard.

Measurement instrument group 25 includes slide slip tester 26, combination tester 27, wheel alignment tester 28, engine analyzer 29, and exhaust gas tester 30. The slide slip tester 26, including a potentiometer, measures the amount of slip between front wheel tires of the motor car 15 and the ground surface to determine the state of alignment of the front wheels. The combination tester 27 measures the speed, braking force, accelerating force, etc. of the motor car 15 while the running condition thereof is simulated. The combination tester 27 is provided with rolls on which the rear wheels of the motor car 15 is placed, a motor for driving the rolls to rotate the rear wheels, and a device for absorbing rotational energy of the rolls. The wheel alignment tester 28 measures the camber of a front wheel and the maximum steering angle. The engine analyzer 29 electrically measures and detects the engine condition with the detecting terminals of the analyzer connected to desired portions of the engine. The exhaust gas tester 30 samples the exhaust gas of the motor car 15 and measures the composition and a density of the exhaust gas. These testers and analyzer 26, 27, 28, 29, and 30 are connected to the central control device 24 to supply the latter with the output signals thereof representative of the measured results. The testers and analyzer 26, 27, 28, 29, and 30 are similar to those disclosed in U.S. Pat. No. 4,121,452.

Figure 3:
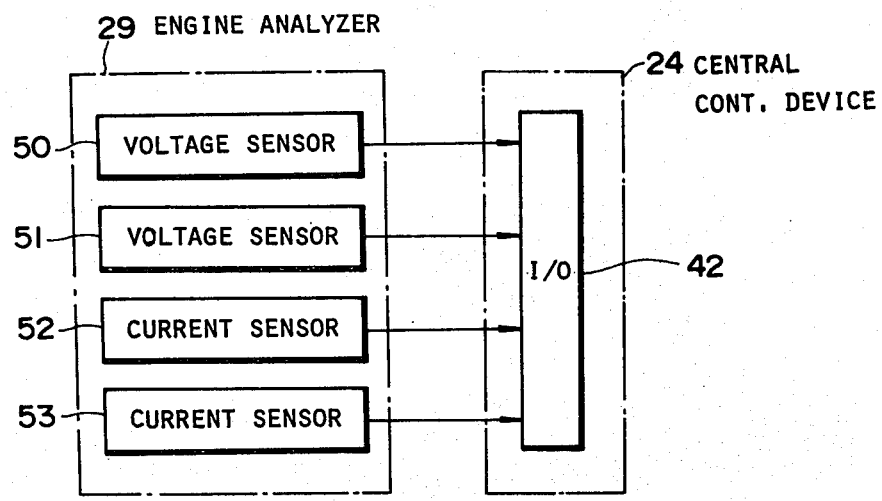
FIG. 3 is a schematic diagram of the details of the engine analyzer in FIG. 1.

As shown in FIG. 3, the engine analyzer 29 includes voltage sensors 50 and 51, as well as current sensors 52 and 53. The sensors 50 and 51 respectively detect battery voltage and high-tension wire voltage, that is, the voltage across a secondary ignition coil. The sensors 52 and 53 detect starter current and alternator current, respectively. These sensors 50, 51, 52, and 53 are connected to the central control device 24 to supply the latter with the output signals thereof representative of the measured results.

As illustrated in FIG. 3, the central control device 24 is composed of a programmable microcomputer which includes a central processor unit (CPU) 41, input/output circuit (I/O) circuit 42, a random access memory (RAM) 43, and a read only memory (ROM) 44. The I/O circuit 42, RAM 43, and ROM 44 are connected to the CPU 41. The I/O circuit 42 is connected to the input circuits 21, 22 and 23 to receive the output signals thereof indicative of the car type, inspection kind, and car record, respectively. The I/O circuit 42 is also connected to the measurement instruments 26, 27, 28, 29 and 30 to receive the output signals therefrom. The I/O circuit 42 includes peak detectors which hold or store the maximum values of the high tension wire voltage, starter current, and others. Some of the stored values are periodically reset. The I/O circuit 42 also includes analog-to-digital converters which transform the output signals of the measurement instruments and the peak detectors into the corresponding digital signals. The RAM 43 has a first section 43A in which car type, inspection kind, and car record data derived from the input device 20 are stored by way of the I/O circuit 42 and the CPU41. The RAM43 also has a second section 43B in which measured values derived from the measurement instrument group 25 and coupled by way of the I/O circuit 42 and the CPU41 are stored.

The slide slip, braking force, maximum steering angle, density of the exhaust gas, high tension wire maximum voltage, battery voltage, alternator current, etc. constitute inspection items measured by instruments 26, 27, 28, 29, and 30. In a computer program of the central control device 24, these inspection items are encoded utilizing a variable I so as to discriminate them from each other. The variable I is any one of 1, 2, 3, . . . , Io. Io is equal to the number of the different inspection items. For example, I=1, I=2, I=3, . . . , I=Io correspond to battery voltage, high tension wire maximum voltage, alternator current, . . . , maximum steering angle, respectively. Measured values derived from the measurement instruments 26, 27, 28, 29, and 30 are designated by MV(I) to be discriminated from each other.

In the program of the central control device 24, car type information from the input circuit 21 is encoded using a variable J to discriminate the car types from each other. The variable J is any one of 1, 2, 3, . . . , Jo. Jo is equal to the number of the different car types.

A memory circuit 33 stores signals representing inspection items and instructions to an operator as a function of inspection kind and car type. In other words, inspection items and instructions required of each inspection kind and car type are registered in a section of a table which is read out by designating the inspection kind and car type. The memory circuit 33 is connected to the central control device 24 so that the required inspection items and instructions are successively selected by the central control device 24 according to the inspection kind and car type.

A memory circuit 34 stores signals representing a set of predetermined reference values for each inspection item (I) and each car type (J). These reference values are used in determining whether the measured values of the inspection items are acceptable or not. The memory circuit 34 is connected to the central control device 24.

The central control device 24 compares the measured values to the corresponding reference values so as to decide whether the measured values are acceptable or not for the respective inspection items. A display 36 and a recorder 37 are connected to the central control device 24. The results of the decisions carried out by the central control device 24 are transmitted to the display 36 and recorder 37, where they are respectively indicated and printed. The required inspection items and instructions selected by the central control device 24 are transmitted to the display 36 so as to be indicated on the display 36.

In fact, the I/O circuit 42 is connected to the memory circuits 33 and 34, display 36, recorder 37, measurement instrument group 25, that is, measurement instruments 26, 27, 28, 29, and 30, input device 20, that is, input circuits 21, 22, and 23. An operation console 40 carries the central control device 24, as well as memory circuits 33 and 34.

Figure 4:
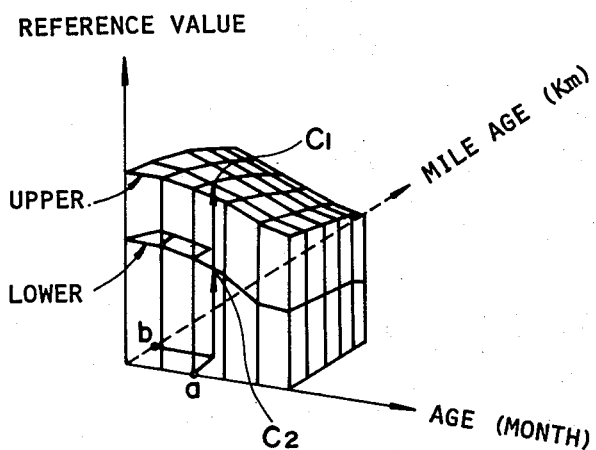
FIG. 4 is a three-dimensional graph of reference values as a function of mile and mileage of the motor car.

Since the characteristics of mechanical and electrical parts of a motor car usually depend on the mileage and age thereof respectively, the reference values for the measured results of each inspection item varying with the car mileage and/or age. Parts of a motor car also depend on the car type. In fact, the memory circuit 34 includes a read only memory (ROM) or random access memory (RAM) with a backup power supply and stores signals representing a set of upper values $C_1$ (FIG. 4) and a set of lower values $C_2$ as a function of both the mileage, b, and age, a, for each inspection item (I) and each car type (J). The upper and lower values $C_1$ and $C_2$ are stored in the memory circuit 34 in the form of two-dimensional tables (I, J), forming a pair of three-dimensional surfaces (I, J) as shown in FIG. 4. Between the upper and lower values $C_1$ and $C_2$ is a range in which the measured value is judged as acceptable.

In the tables (I, J), upper and lower values $C_1$ and $C_2$ correspond to preset discrete mileages and ages. When it is necessary to use upper and lower values corresponding to mileages and ages between the foregoing discrete values thereof, the central control device 24 determines or calculates the upper and lower values by use of a well-known interpolation technique.

Figure 5:
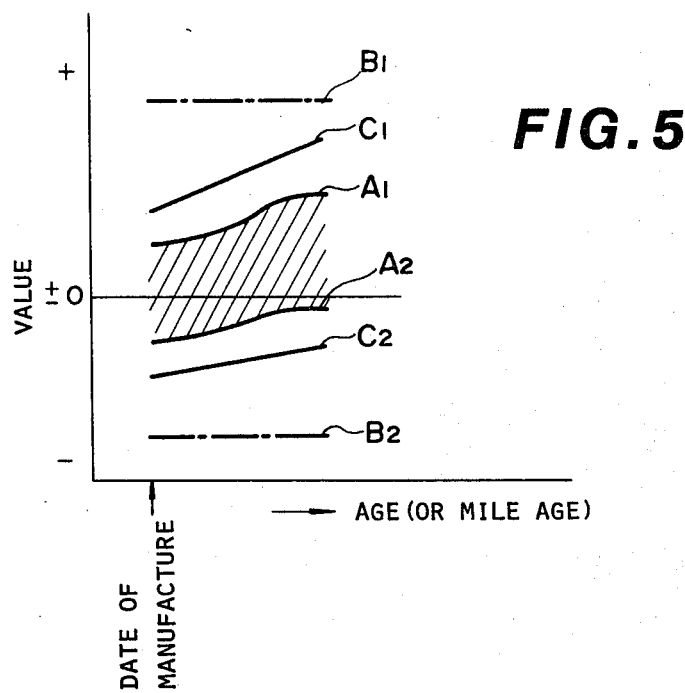
FIG. 5 is a graph of the most proper range in the characteristic values for a car element and the reference values as a function of the age or mileage of the motor car.

For example, the most appropriate range of the measured values for a car element depends on the mileage or age of the motor car as shown by the hatched area in FIG. 5, where $A_1$ designates the upper limit of the most appropriate range and $A_2$ designates the lower limit thereof. In this case, a set of upper values $C_1$ is set somewhat above the upper limit $A_1$ in a parallel relationship, while a set of lower values $C_2$ is set somewhat below the lower limit $A_2$ in a parallel relationship. A set of upper values $C_1$ and a set of lower values $C_2$ are positioned between the lines $B_1$ and $B_2$ in FIG. 5 which define therebetween a range where the car element can operate normally.

Figure 6:
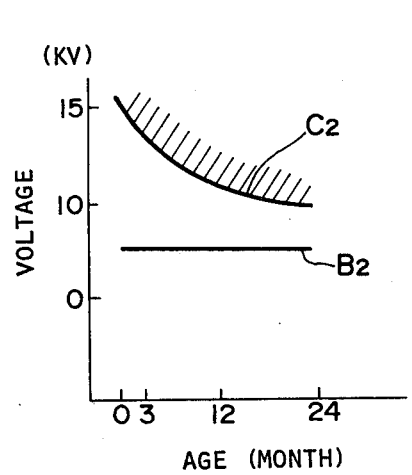
FIG. 6 is a graph of the reference values as a function of the age of the motor car in the case of a high tension wire maximum voltage.

A set of upper values $C_1$ and a set of lower value $C_2$ may be dependent on only one of the mileage and age of the motor car. For example, a set of lower values $C_2$ for high tension wire maximum voltage decreases with only the age of the motor car in the case of as shown in FIG. 6, where the line $B_2$ indicates the lower limit of a normal operation range with respect to the ignition coil.

Figure 7A:
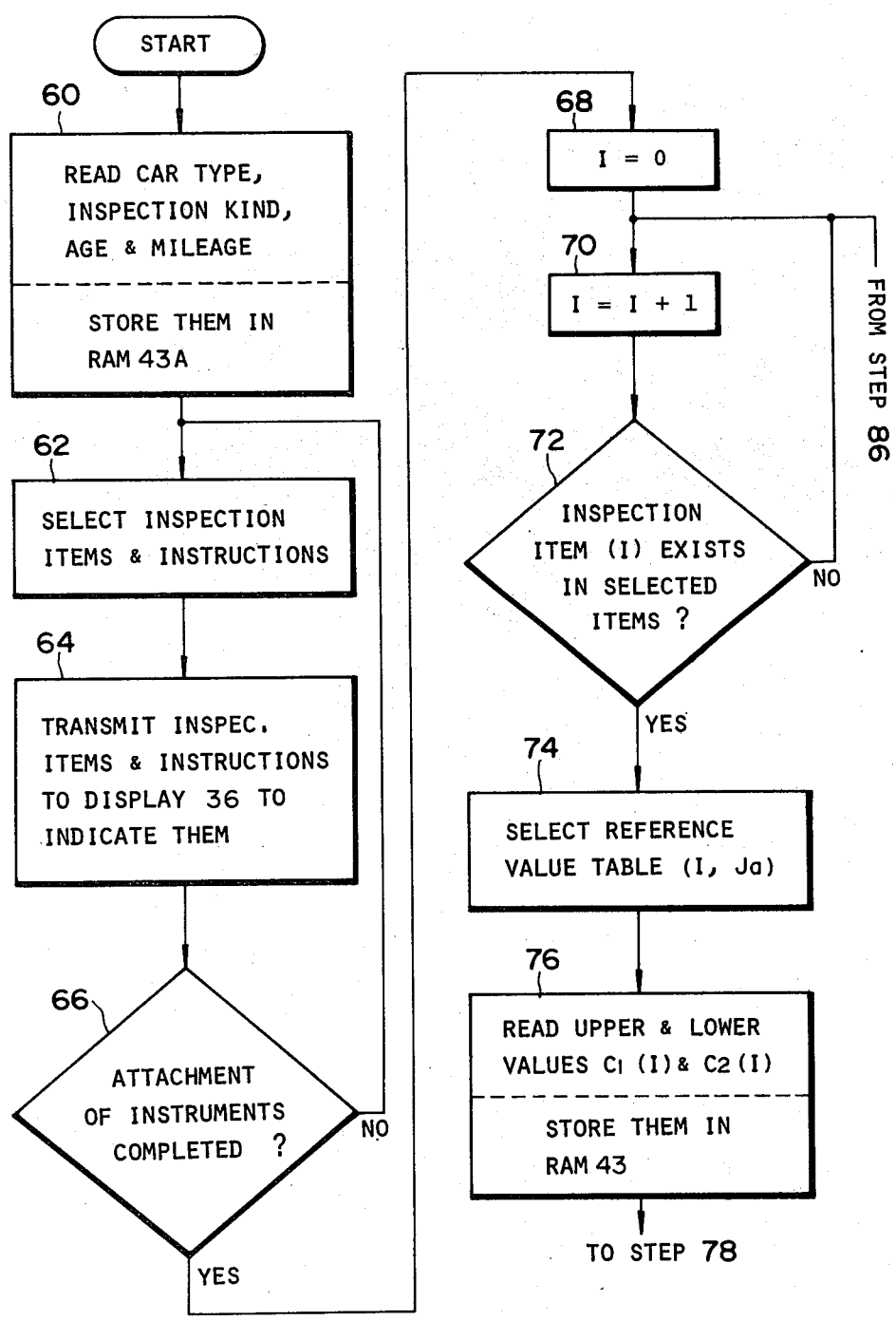
FIGS. 7A and 7B together are a flowchart of the action of the central control device in FIG. 2.

In operation, after placing the motor car 15 in position, an operator or inspector first operates the input circuits 21, 22, and 23 to supply the central control device 24 with data indicative of the car type, inspection kind, and car record including age and mileage. The central control device 24 responds to the data signals from circuits 21-23, instrument group 25 and an internal program to successively perform the following steps according to a program stored in the ROM 44. As illustrated in the flowchart of FIG. 7A, the central control device 24 reads car type, inspection kind, car age and mileage from the output signals of the input circuits 21, 22, and 23 respectively, and stores them in the RAM43A in step 60. Assume that the car type variable J is Ja. Then, the central control device 24 reads or selects the required inspection items and instructions from the table in the memory 33 according to the read inspection kind and car type data in step 62. In a subsequent step 64, the central control device 24 transmits the selected inspection items and instructions to the display 36. The display 36 then indicates the selected inspection items and instructions to inform the operator of the necessary operation and the measurement instruments to be attached to the motor car 15.

In a step 66, the central control device 24 determines, according to the signals from the measurement instrument group 25, whether or not the necessary measurement instruments have been completely connected to the motor car 15. When the connections have not been completed, the central control device 24 repeats the actions in the steps 62, 64, and 66. Thus, the operator is signalled to complete the connections of the necessary measurement instruments. A manually-operated device (not shown) may be provided to inform the central control device 24 that the necessary measurement instruments have been connected to the motor car 15. When the connections have been completed, all of the necessary measurement instruments start to feed the output signals thereof to the central control device 24 and the central control device 24 proceeds to a step 68.

In step 68, the central control device 24 sets the inspection item identification variable I to 0 as indicated supra values of I=1, 2, 3, ... correspond to battery voltage, maximum high tension wire voltage, alternator current, ..., respectively. The program next advances to step 70, wherein the central control device 24 increments I by one, i.e. sets the variable I to I+1. In a step 72, the central control device 24 determines whether or not the present inspection item (I) set during step 70, exists in the inspection items selected in the previous step 62. When the inspection item (I) does not exist in the selected items, the control device 24 returns to incrementing step 70, thence to step 72 and repeats until step 72 determines that the inspection item (I) exists in the selected items. When such a determination is made, the program advances to step 74 wherein the control device 24 selects the reference value table (I, Ja) from the tables stored in the memory circuit 34 according to the inspection item (I) and the car type (Ja). For example, the tables (1, Ja), table (2, Ja), table (3, Ja) ... respectively correspond to the battery voltage function, high tension wire voltage function, alternator current function, ..., for the car type (Ja).

Figure 7B:
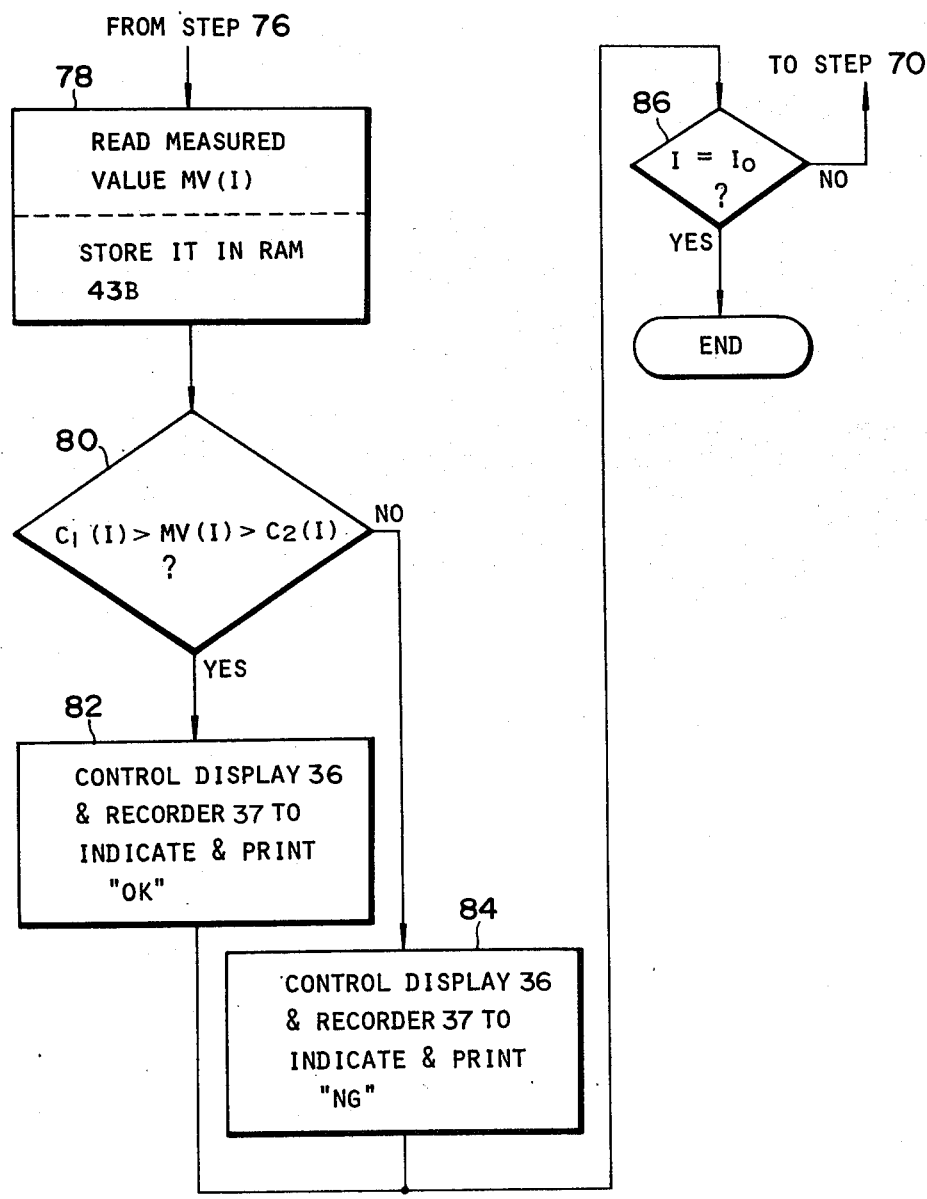

After the reference value table has been selected, the program advances to step 76, wherein data from the selected table (I, Ja) are read into the control device 24; these data represent the upper and lower values $C_1(I)$ and $C_2(I)$ according to the read mileage and age. Control device stores the read upper and lower values $C_1(I)$ and $C_2(I)$ in the RAM43. As illustrated in FIG. 7B, the program next advances to step 78 wherein the control device 24 reads the measured values MV(I) from the measurement instrument group 25 and stores them in the RAM43B. For example, the measured values MV(1), MV(2), MV(3), ... correspond to measurements of the battery voltage, high tension wire maximum voltage, alternator current, ..., respectively. Next, during step 80, the central control device 24 determines whether or not the measured value MV(I) is in the range from the lower value. $C_2(I)$ to the upper value $C_1(I)$. When the measured value MV(I) is in the range from the lower value $C_2(I)$ to the upper value $C_1(I)$, the program advances to step 82 wherein central control device 24 controls the display 36 and recorder 37 so that the display 36 and recorder 37 respectively indicate and print "OK". When the measured value MV(I) is not in the range, the program advances to step 84 wherein central control device 24 controls the display 36 and recorder 37 so that the display 36 and recorder 37 indicate and print "NG". "OK" and "NG" respectively mean that the measured value MV(I) is and is not acceptable.

After execution of step 82 and 84, whichever is appropriate, the program advances to step 86 wherein a determination is made as to whether I=Io. Io is set equal to the number of the different inspection items. When I is not equal to Io, the control device 24 returns to the action in the step 70. Thus, a determination is made as to whether the measured value MV(I) is acceptable or not for every inspection item selected in the previous step 62. When I is equal to Io, the central control device 24 ends its programmed action.

Since the reference values, that is, the upper and lower values $C_1(I)$ and $C_2(I)$, are dependent on the car age and mileage, the determination as to whether the measured value MV(I) is acceptable or not can be performed more reliably for the car of any age and mileage as compared to the case where the reference values are set independent of the car age and mileage.

A second embodiment of the present invention is designed in a manner similar to that of the previously described first embodiment except for the following points. A memory circuit 34 stores signals representing a pair of constants for each inspection item and each car type. These constants are used in calculating upper and lower values for determining whether or not the measured inspection item values are acceptable.

Figure 8:
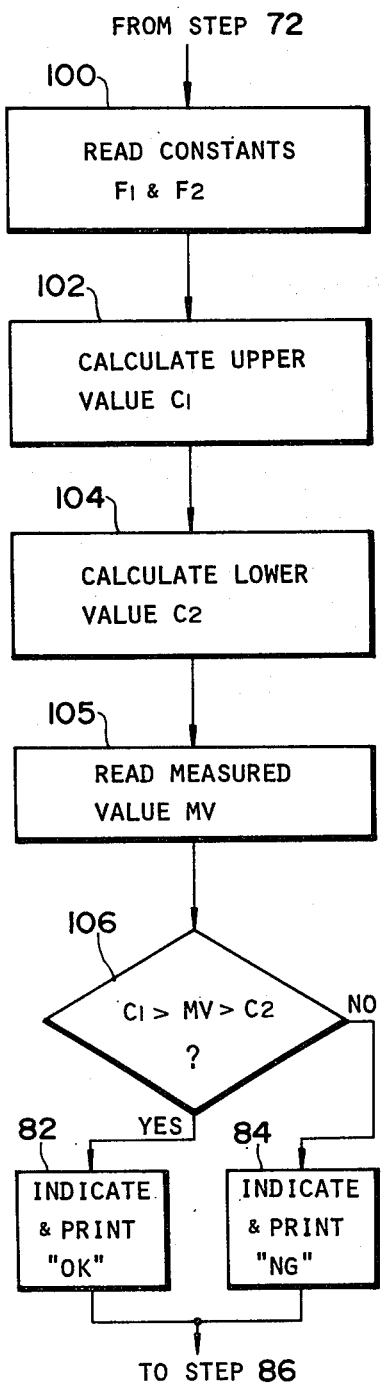
FIG. 8 is a partial flowchart of the action of a central control device according to a second embodiment of the present invention.

As illustrated in the flowchart of FIG. 8, the program of FIGS. 7A and 7B is modified so that after step 72 the program causes central control device 24 to read the constants $F_1$ and $F_2$ for upper and lower values $C_1$ and $C_2$ respectively from the memory circuit 34. Next, during step 102, the control device 24 calculates the upper value $C_1$ by use of the following equation:

$$C_1 = \frac{1}{D \cdot E} + F_1 \qquad (1)$$

where D is the age of the motor car expressed in terms of year for example; E is the mileage of the motor car expressed in terms of thousand Km for example; and $F_1$ is the foregoing constant for the upper value, which is two for example. Next, during step 104, the control device 24 calculates the lower value $C_2$ by use of the following equation:

$$C_2 = \frac{1}{D \cdot E} + F_2 \qquad (2)$$

where D and E are the age and mileage respectively; and $F_2$ is the foregoing constant for the lower value, which is one for example. Next, during step 105, the central control device 24 reads a measured value MV from one of the instruments of a measurement instrument group 25 and stores it in a RAM43B. In a subsequent step 106, the control device 24 determines whether or not the measured value MV of the present inspection item is in the range from the calculated lower value $C_2$ to the upper value $C_1$. When the answer to the question in the step 106 is yes, the program advances to step 82 wherein central control device 24 respectively controls display 36 and recorder 37 to indicate and print "OK". When the answer is no, the program advances to step 84 wherein central control device 24 controls the display 36 and the recorder 37 to indicate and print "NG". Steps 82 and 84 in FIG. 8 are similar to steps 82 and 84 of FIG. 7B, and are followed by a step 86 similar to the step 86 of FIG. 7B. It should be understood that equations for determining upper and lower values $C_1$ and $C_2$ may have forms other than those described in Equations (1) and (2). In the embodiment of FIG. 8, the memory circuit 34 can be small in capacity.

A third embodiment of the present invention is designed in a manner similar to that of the embodiment of FIGS. 7A and 7B, except for the following points. In the third embodiment, provision is made for the car record to contain additional information about conditions of car use, e.g. whether the motor car is used for private or business purposes, such as taxi use. Since taxi cabs usually are subject to a higher percentage of city driving than private cars, reference values and/or upper and lower values may be adjusted to reflect this type of use which could not be determined from vehicle age or mileage data. This embodiment provides more accurate decisions based on the measured values.

Figure 9:
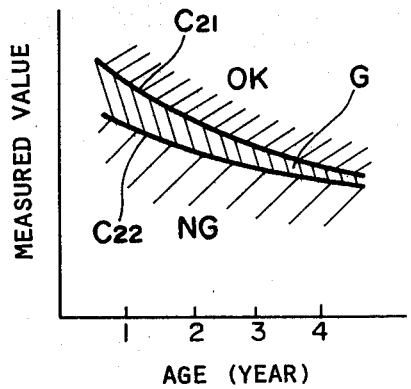
FIG. 9 is a graph of first and second lower value sets of the reference values as a function of the age of the motor car according to a fourth embodiment of the present invention.

A fourth embodiment of the present invention is designed in a manner similar to that of the embodiment of FIGS. 7A and 7B except for the following points. A memory circuit 34 holds sets of first and second upper values, and sets of first and second lower values. The values in the first upper value set are larger than those of the second upper value set. The values in value set the first lower value set are larger than those of the second lower value set. Sets of the second upper and first lower values define a range therebetween in which the measured values are acceptable. Sets of the first and second upper values, and those of the first and second lower values define ranges therebetween where caution should be taken concerning the inspected car parts. In a range lower than a set of the second lower values of a range higher than a set of the first upper values, the measured values are not acceptable. As illustrated in FIG. 9, a lower cautionary range G is between the first and second lower value sets $C_{21}$ and $C_{22}$; range G decreases with the age of the motor car.

Figure 10:
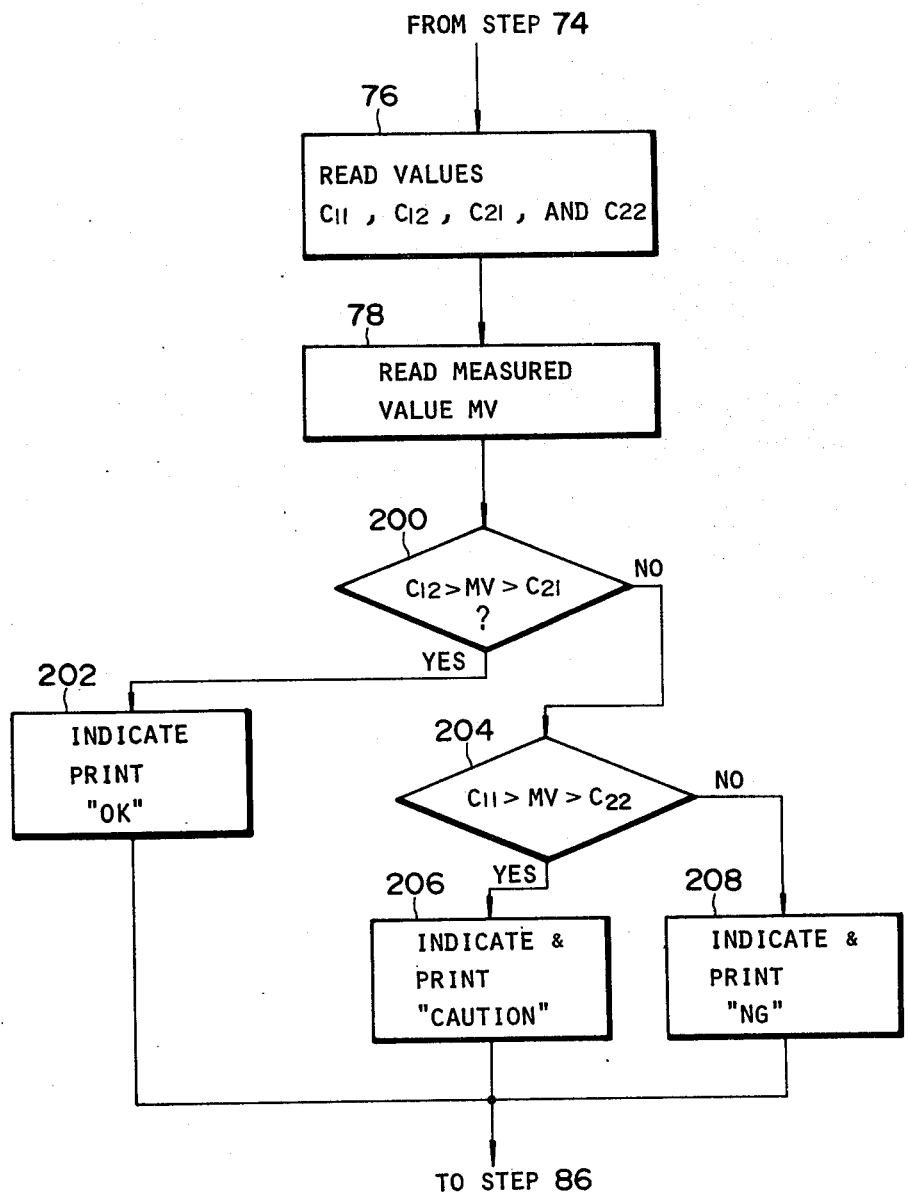
FIG. 10 is a partial flowchart of the action of a central control device according to the fourth embodiment of the present invention.

The program for the fourth embodiment is modified from that of FIGS. 7A and 7B, as illustrated in FIG. 10. After step 74, FIG. 7A, the program advances to step 76, FIG. 10, wherein central control device 24 reads the first and second upper values $C_{11}$ and $C_{12}$, first and second lower values $C_{21}$ and $C_{22}$ from the data table in the memory circuit 34. Next during step 78, similar to step 76 of FIG. 7B, the central control device 24 reads the measured values MV from a measurement instrument of group 25 and stores it in a RAM43B. Next, during step 200, the central control device 24 determines whether the measured value MV of the present inspection item is between the second upper and first lower values $C_{12}$ and $C_{21}$. When step 200 provides a positive indication, the program advances to step 202 wherein the central control device 24 controls display 36B and recorder 37 to indicate and print "OK" respectively. When step 200 provides a negative indication, the program advances to step 204 wherein the central control device 24 determines whether or not the measured value MV is between the first upper and second lower values $C_{11}$ and $C_{22}$. When step 204 provides a positive indication the program advances to step 206 wherein the central control device 24 controls the display 36 and recorder 37 to indicate and print "caution" respectively. When step 204 provides a negative indication the program advances to step 208 wherein the central control device 24 controls the display 36B and recorder 37 to indicate and print "NG" respectively. After the steps 202, 206, and 208, the central control device 24 proceeds to the action in a step 86 which is similar to step 86 of FIG. 7B. This embodiment provides more appropriate determinations of the measured values of the inspection items.

A fifth embodiment of the present invention is designed in a manner similar to that of the embodiment of FIGS. 7A and 7B except for the following points. A measurement instrument group 25D of this embodiment includes an engine coolant temperature sensor and an engine load sensor. A central control device 24 of the fifth embodiment determines, from the engine coolant temperature signal whether the engine of the inspected motor car has just been started from a cold condition or has been warmed up. The central control device 24 determines from the engine load signal whether or not the engine has just been operated with a heavy load. A memory circuit 34 of this embodiment holds a set of upper basic values $Cb_1$ and a set of lower basic values $Cb_2$ as a function of age and/or mileage of the motor car for each inspection item. The central control device 24 corrects the upper and lower basic values $Cb_1$ and $Cb_2$ to determine upper and lower reference values $C_1$ and $C_2$ to decide whether the measured value of the inspection item is acceptable or not. In fact, the upper and lower values $C_1$ and $C_2$ are calculated by multiplying the upper and lower basic values $Cb_1$ and $Cb_2$ by respective constants which are stored in the memory circuit 34; the values of the respective constants depend on the determination of whether or not the engine is operating immediately after a cold start or after being completely warmed up and whether or not the engine is operating after running with a heavy load. This embodiment provides accurate judgments of whether the measured values are acceptable or not even when a speedy inspection is desired so that the engine is tested immediately after a cold start. This embodiment especially provides effective determinations of engine malfunctions immediately after operation with a heavy load.

It should be understood that further modifications and variations may be made in the present invention without departing from the spirit and scope of the present invention as set forth in the appended claims.

What is claimed is:

1. An apparatus for inspecting vehicles comprising:
   (a) means for generating vehicle type signals indicative of the type of vehicle being inspected,
   (b) means for measuring a plurality of vehicle parameters and generating vehicle measurement signals indicative thereof,
   (c) means for generating additional vehicle signals indicative of at least one of vehicle age and mileage,
   (d) means for generating a plurality of reference value signals in response to said vehicle type signals and said additional vehicle signals, said reference value signals indicating reference values for the measured vehicle parameters, said reference value signals depending on the additional vehicle signals so that the reference values vary in accordance with at least one of vehicle age and mileage,
   (e) means for comparing said vehicle measurement signals with said reference value signals for generating one of vehicle condition acceptable and vehicle condition unacceptable signals, and
   (f) means for providing a visual indication of said vehicle condition acceptable and vehicle condition unacceptable signals.

2. An apparatus as recited in claim 1, wherein said reference value signal generating means includes a memory circuit for storing a set of reference values as a function of vehicle type and at least one of vehicle age and mileage.

3. An apparatus as recited in claim 1, wherein said reference value signal generating means and said comparing means comprise a programmable microcomputer for calculating reference values from vehicle type and at least one of vehicle age and mileage by use of preset equations.

4. An apparatus as recited in claim 1, wherein said means for generating reference value signals derives indications of upper reference values and lower reference values, said means for comparing deriving the: (a) vehicle condition acceptable signals in response to the measured vehicle parameters being within range between said lower reference values and said upper reference values, and (b) vehicle condition unacceptable signals in response to the measured vehicle parameters being out of said ranges.

5. A method of inspecting vehicles comprising the steps of:
   (a) generating vehicle type signals indicative of the type of vehicle being inspected,
   (b) measuring a plurality of vehicle parameters and generating vehicle measurement signals indicative thereof,
   (c) generating additional vehicle signals indicative of at least one of vehicle age and mileage,
   (d) generating a plurality of reference value signals in response to said vehicle type signals, said reference value signals indicating reference values for the measured vehicle parameters,
   (e) varying said reference value signals in accordance with said additional vehicle signals so that the reference values depend on at least one of vehicle age and mileage,
   (f) comparing said vehicle measurement signals with said reference value signals for generating one of vehicle condition unacceptable and vehicle condition unacceptable signals, and
   (g) providing a visual indication of said vehicle condition acceptable and vehicle condition unacceptable signals.

6. A method as recited in claim 5, wherein the reference value signal generating step includes the step of calculating reference values from vehicle type and at least one of vehicle age and mileage by use of preset equations.

7. A method of automatically inspecting different types of automotive vehicles having differing age and/or mileage parameters, the different types of vehicles being indicated by variables such as vehicle maker, model, and engine type, the method being performed with a programmed digital computer and measuring instruments for inspected engine, steering and braking responses of the vehicles, comprising for each vehicle: supplying the computer with data indicative of the vehicle type and at least one of the parameters, supplying the computer with signals indicative of the vehicle engine, steering, and braking responses in response to outputs of the measuring instruments; the computer responding to the program, signals and data indicative of the vehicle type and at least one of the parameters, to (a) derive extreme values that are functions of the at least one parameter and vehicle type for a range of acceptable values for each of the inspected engine, steering and braking responses, (b) compare the outputs of the measuring instruments indicative of the vehicle engine, steering, and braking responses with the range of values for the corresponding responses, and (c) derive a malfunction signal for each engine, steering and braking response outside of the range of values therefor; and indicating each malfunction in response to each of the malfunction signals.

8. The method of claim 7 wherein the vehicles have differing age and mileage parameters and the computer is supplied with data indicative of both of said parameters, the computer accessing a table includes therein for the range of values as a function of both of the parameters and the automotive types in response to the data indicative of both of said parameters and vehicle type to derive each range of acceptable values.

9. The method of claim 7 wherein the vehicles have differing age and mileage parameters and the computer is supplied with data indicative of both of said parameters, the computer being programmed to solve equations for the extreme values, the equations including coefficients dependent on the type of vehicles, the computer responding to (a) the vehicle type data to access a memory to retrieve the coefficients for the particular vehicle type and (b) both of the parameters and the retrieved coefficients to solve the equations to derive each range of the extreme acceptable values.

10. The method of claim 7 wherein the computer is programmed to solve equations for the extreme values, the equations including coefficients dependent on the type of vehicles, the computer responding to (a) the vehicle type data to access a memory to retrieve the coefficients for the particular vehicle type and (b) the at least one of the parameters and the retrieved coefficients to solve the equations to derive each range of the extreme acceptable values.

11. The method of claim 10 wherein the equations are such that the range decreases as the value of the at least one parameter increases.

12. The method of claim 7 wherein the computer responds to the at least one parameter such that the range decreases as the value of the at least one parameter increases.

13. Apparatus for automatically inspecting different types of automotive vehicles having differing age and- /or mileage parameters, the different types of vehicles being indicated by variables such as vehicle maker, model, and engine type, comprising a programmed digital computer, measuring instruments for deriving signals indicative of inspected engine, steering and braking responses of the vehicles, means for supplying the computer with data indicative of the vehicle type and at least one of the parameters, means for supplying the computer with the signals indicative of the vehicle engine, steering, and braking responses in response to outputs of the measuring instruments; the computer responding to the program, signals and data indicative of the vehicle type and at least one of the parameters, to (a) derive extreme values that are functions of the at least one parameter and vehicle type for a range of acceptable values for each of the inspected engine, steering and braking responses, (b) compare the outputs of the measuring instruments indicative of the vehicle engine, steering, and braking responses with the range of values for the corresponding responses, and (c) derive a malfunction signal for each engine, steering and braking response outside of the range of values therefor; and means for indicating each malfunction in response to each of the malfunction signals.

14. The apparatus of claim 13 wherein the vehicles have differing age and mileage parameters and the computer is supplied with data indicative of both of said parameters, the computer including a table for the range of values as a function of both of the parameters and the automotive types, the computer accessing the table in response to the data indicative of both of said parameters and vehicle type to derive each range of acceptable values.

15. The apparatus of claim 13 wherein the vehicles have differing age and mileage parameters and the computer is supplied with data indicative of both of said parameters, the computer including a table for the range of values as a function of both of the parameters and the automotive types, the computer accessing the table in response to the data indicative of both of said parameters and vehicle type to derive each range of acceptable values.

16. The apparatus of claim 13 wherein the vehicles have differing age and mileage parameters and the computer is supplied with data indicative of both of said parameters, the computer being programmed to solve equations for the extreme values, the equations including coefficients dependent on the type of vehicles, the computer responding to (a) the vehicle type data to access a memory to retrieve the coefficients for the particular vehicle type and (b) of the parameters and the retrieved coefficients to solve the equations to derive each range of the extreme acceptable values.

17. The apparatus of claim 16 wherein the equations are such that the range decreases as the value of the at least one parameter increases.

18. The apparatus of claim 13 wherein the computer responds to the at least one parameter such that the range decreases as the value of the at least one parameter increases.

* * * * *